US011586857B2

(12) United States Patent
Hu et al.

(10) Patent No.: US 11,586,857 B2
(45) Date of Patent: Feb. 21, 2023

(54) BUILDING ENTRY MANAGEMENT SYSTEM

(71) Applicant: FUJIFILM Business Innovation Corp., Tokyo (JP)

(72) Inventors: Hao Hu, Sunnyvale, CA (US); Yanxia Zhang, Cupertino, CA (US); Qiong Liu, Cupertino, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/903,176

(22) Filed: Jun. 16, 2020

(65) Prior Publication Data

US 2021/0390354 A1    Dec. 16, 2021

(51) Int. Cl.
*G06T 7/70* (2017.01)
*G06K 9/62* (2022.01)
*G06V 10/44* (2022.01)
*G06V 20/52* (2022.01)

(52) U.S. Cl.
CPC .............. *G06K 9/6267* (2013.01); *G06T 7/70* (2017.01); *G06V 10/454* (2022.01); *G06V 20/52* (2022.01); *G06T 2207/20081* (2013.01); *G06T 2207/20084* (2013.01)

(58) Field of Classification Search
CPC ............. G06K 9/6267; G06K 9/00771; G06K 9/4628; G06T 7/70; G06T 2207/20084; G06T 2207/20081; G06V 20/52; G06V 10/454
See application file for complete search history.

(56) References Cited

U.S. PATENT DOCUMENTS

| | | | | |
|---|---|---|---|---|
| 2007/0011722 A1* | 1/2007 | Hoffman | ............... | G08B 31/00 |
| | | | | 726/3 |
| 2015/0319411 A1* | 11/2015 | Kasmir | ............ | G08B 13/19684 |
| | | | | 348/143 |
| 2020/0035247 A1* | 1/2020 | Boyadjiev | ............ | G06K 9/00536 |
| 2021/0097547 A1* | 4/2021 | Stockman | ........ | G06Q 20/40145 |
| 2021/0264496 A1* | 8/2021 | Claros | ....................... | G06N 3/04 |

OTHER PUBLICATIONS

Deng, J., ImageNet: A Large-Scale Hierarchical Image Database, 2009 IEEE Conference on Computer Vision and Pattern Recognition, 2009, pp. 248-255.
Devlin, J., et al., BERT: Pre-Training of Deep Bidirectional Transformers for Language Understanding, 2018, arXiv:1810.04805, 16 pgs.
Han, K. J., et al., State-of-the-Art Speech Recognition Using Multi-Stream Self-Attention With Dilated 1D Convolutions, Oct. 1, 2019, arXiv:1910.00716, 8 pgs.
Hermans, A., et al., In Defense of the Triplet Loss for Person Re-Identification, Nov. 21, 2017, arXiv: 1703.07737, 17 pgs.
Lin, T-Y., et al., Microsoft COCO: Common Objects in Context, European Conference on Computer Vision, 2014, pp. 1-15.

(Continued)

*Primary Examiner* — Syed Haider
(74) *Attorney, Agent, or Firm* — Procopio, Cory, Hargreaves & Savitch LLP (57) ABSTRACT

A computer-implemented method comprises receiving an input associated with the arrival of an entity, performing a classification on the input to determine a purpose of the arrival of the entity, and based on a determined classification of the purpose of the arrival of the entity, invoking an action.

19 Claims, 9 Drawing Sheets

(56) References Cited

OTHER PUBLICATIONS

Redmon, J., et al., YOLOv3: An Incremental Improvement, Apr. 8, 2018, arXiv:1804.02767, 6 pgs.

Sandler, M., et al., MobileNet V2: Inverted Residuals and Linear Bottlenecks, Proceedings of the IEEE Conference on Computer Vision and Pattern Recognition, 2018, pp. 4510-4520.

Zheng, L., et al., Scalable Person Re-Identification: A Benchmark, Proceedings of the IEEE International Conference on Computer Vision, 2015, pp. 1116-1124.

* cited by examiner

BUILDING ENTRY MANAGEMENT SYSTEM

BACKGROUND

Field

Aspects of the example implementations relate to methods, systems and user experiences associated with virtual management of entities (e.g., objects and/or visitors) to a building, and more specifically, the application of predictive tools to classify a visitor and invoke actions based on the classification.

Related Art

In the related art, a resident must come to the door and determine the purpose of every visitor in person. This related art circumstance could may result in delayed response for urgent messages when nobody is at home. The related art approach can be inconvenient when a residence is occupied by other persons. A message may be missed, such as if the message is left with a neighbor, when nobody is at home. When a home is visited by a person with bad intentions, there is a risk associated with directly answering the door, as this may help a visitor to break into the house and harm residents.

With respect to related art delivery services, since delivery services typically operate during working hours, a resident may be not be able to personally receive a delivery because the resident is working when the delivery arrives. Thus, delivery operators frequently drop items in front of door without checking whether the items have been successfully received by the addressee. As a result, the items may be damaged due to weather or taken by someone else. Alternatively, a resident may miss a message from a visitor, if he or she is not home.

Further, related art online activities keep growing, particularly in the context of social distancing and a growth of online shopping. Thus, more families are relying on delivery services for daily needs such as making purchases and ordering foods. However, due to inevitable latency between online requests and offline delivery, it is very hard to coordinate the desired delivery time with resident's own schedule. Thus, items may be delivered and left outside, such that they may be easily stolen without notice.

There is an unmet need in the related art to develop a solution to help a resident identify the purpose of visitors.

SUMMARY

According to an aspect of the example implementations, a computer-implemented method is provided, comprising receiving an input associated with the arrival of an entity, performing a classification on the input to determine a purpose of the arrival of the entity, and based on a determined classification of the purpose of the arrival of the entity, invoking an action.

Example implementations may also include a non-transitory computer readable medium having a storage and processor, the processor capable of executing instructions associated with the application of predictive tools to classify a visitor and invoke actions based on the classification.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are directed to a system to manage incoming entities, such as visitors or objects to a building (e.g., home or dwelling) in a smart fashion. Intelligent Visitor Management (IVM) may form a part of a smart home solution in the age of IoT, as it allows for the receiving of visitors in an efficient and safe manner. The example implementation includes is an integrated, multi-functional IVM solution to assist residents of a building (e.g., a home) with reception of visitors in different scenarios, by automatically extracting a visiting purpose of a user, and notifying the corresponding resident(s). Accordingly, a resident may not need to answer every doorbell, or worry about missing an important message or having deliveries damaged or stolen.

For example, the example implementation may address the related art problem via an integrated framework. Artificial intelligence (AI) modules such as purpose prediction and a dialogue system are applied, to identify a predicted purpose of each visitor and provide an action and logic accordingly based on predicted purpose.

When a visitor arrives for visiting a resident or providing a delivery, the example implementation will directly notifies the resident the visitor wants to meet, deliver to, or service. If it is determined that a visitor has malicious intentions, a warning is provided to residents to be prepared, and visitor behavior is monitored to alert the resident to potential harm.

For drop-off deliveries, the example implementations may continue to monitoring a delivered item and detect any individual that tries to take that item, therefore reducing the risk of the delivered item being stolen. If a resident has a customized requirement, the example implementation, may provide corresponding instructions to an operator to make sure an item is properly handled at delivery time.

Figure 1:
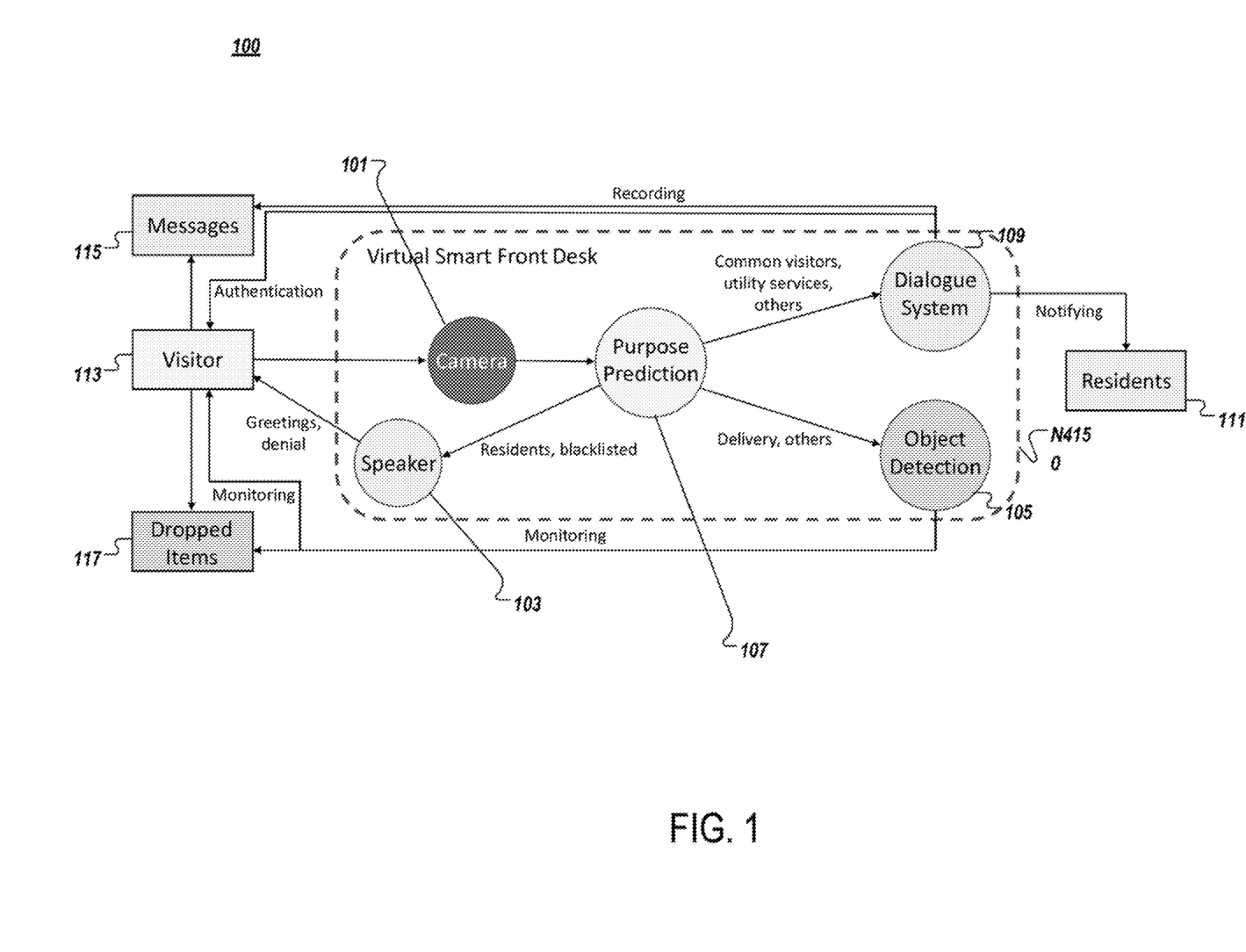
FIG. 1 is a functional block diagram of an example implementation.

FIG. 1 illustrates various system elements according to an example implementation 100. More specifically, the core components of the system include a sensor such as a camera 101 and an output such as a speaker 103 that can be mounted on the door, for example. Further, vision and audio based AI modules are provided for object detection 105, purpose prediction 107 and dialogue system 109. The camera 101 captures visual information of the user, and based on the visual information, a purpose is predicted as explained below.

Upon deployment, a resident 111 will be asked to register by taking a picture and register an account via a personal device (e.g. downloading an application on a smart phone). After that, the resident may use the example implementations to detect coming visitors 113 and predict their purposes based on information received from the sensor, such as visual information collected from the camera 101.

According to the predicted purpose as determined by the purpose prediction module 107, visitors will be categorized into different types: common visitors, utility service visitors, parcel couriers, residents, blacklisted and others. Then, for each type of visitors, the system may generate different actions, as explained below.

Common visitors may engage with the dialogue system 109 to further interact with the visitor 113 to make sure his/her purpose is well handled. For example, a query may be generated to determine who the visitor 113 wants to meet, and what business he/she has. If a visitor 113 comes to meet one of residents, the corresponding resident 111 will be directly notified about the upcoming visit. If there is any message visitor 115 wants to give, that message may be recorded and directly sent to the resident 111.

In case a target resident 113 is away from the building (e.g., as determined by localizing resident's personal device), the system may further schedule a time with the visitor 113 and notify the resident with information of revisiting, or record the message that the visitor 113 wants to deliver, and send the recorded message 115 to the resident 111. For all cases above, other residents in the same house are not involved, and will be not bothered by the disruption.

If a resident 113 needs to schedule utility services when they are out, they can request a server's bio-metric information from a service provider and send it to the system. When server arrives and is classified as a utility service visitor 113, authentication will be performed by comparing his/her bio-metric info with the one from provider. After authentication, the door may be unlocked for the server, if residents 111 permit it.

For parcel couriers, a courier who is the visitor 113 may be instructed to place delivered items 117 at a designated covered region. The system is equipped with a laser pointer (e.g., mounted on the door) that can specify the region for drop-off After items 117 are dropped, residents 111 will be notified and the system begins to monitor the region. If items 117 in the region are detected to be moved by other people except residents, residents are alerted about the potential theft and capture the scene for potential evidence.

If a resident 111 returns and is identified, the system (e.g., speaker and video screen) will deliver a warm greeting to welcome resident 111 back home and give a reminder of automatically scheduled revisit and recorded messages 115, if any.

Residents 111 can put unwelcome visiting purpose (e.g. advertising) into blacklist. When a visitor 113 is categorized as blacklisted, he/she will be directly informed that residents 111 are not available. In such cases residents 111 will not be notified, such that they can completely get rid of annoying disruptions.

If a visitor 113 is identified as "others", it means his/her real purpose is unclear and could be malicious to residents 11. In such a case, the user is validated with caution. Like situations of common visitors, the visitor may be asked several questions about the visiting purpose. In this situation, due to the cautionary nature of the classification, all residents, as opposed to a single resident, will be notified about the visitor and asked to verify if such visiting is expected. Meanwhile, the visitor's behavior will be tracked at the door to make sure residents 113 will be alerted in time when harmful actions are detected.

In addition to scenarios of handling visitors, the integrated modules can also allow it to do other things. For example, residents can customize functionalities of the example implementations to meet their special needs. Residents may add or delete questions in dialogue system to have a more serious or efficient purpose validation.

The degree of the mounted laser pointer can be changed to adjust the region for monitoring drop-offed items if residents determine that the default location may cause an inconvenience.

When no visitor is sighted, monitor of contextual environments may be performed, and prediction temperature and weather (e.g., raining, windy, snow) may be provided, to recommend a delivery be placed at appropriate locations.

With respect to the example implementations, the core functionalities of the example implementations are achieved by vision and audio-based AI modules: object detection 105, purpose prediction 107, and dialogue system 109.

The object detection module 105 is responsible for continuously tracking the location of an object or people that remain in the field of view of the camera 101. The example implementation is based on an detection method such as YOLOv3, which is an Convolutional Neural Network (CNN) that takes an image captured from camera as inputs, and outputs with coordinates of detected object. The network will be trained on large-scale datasets such as ImageNet and MS COCO first. Then, the network will be tuned on human and package centralized datasets to specialize on detecting visitors and items.

Figure 2:
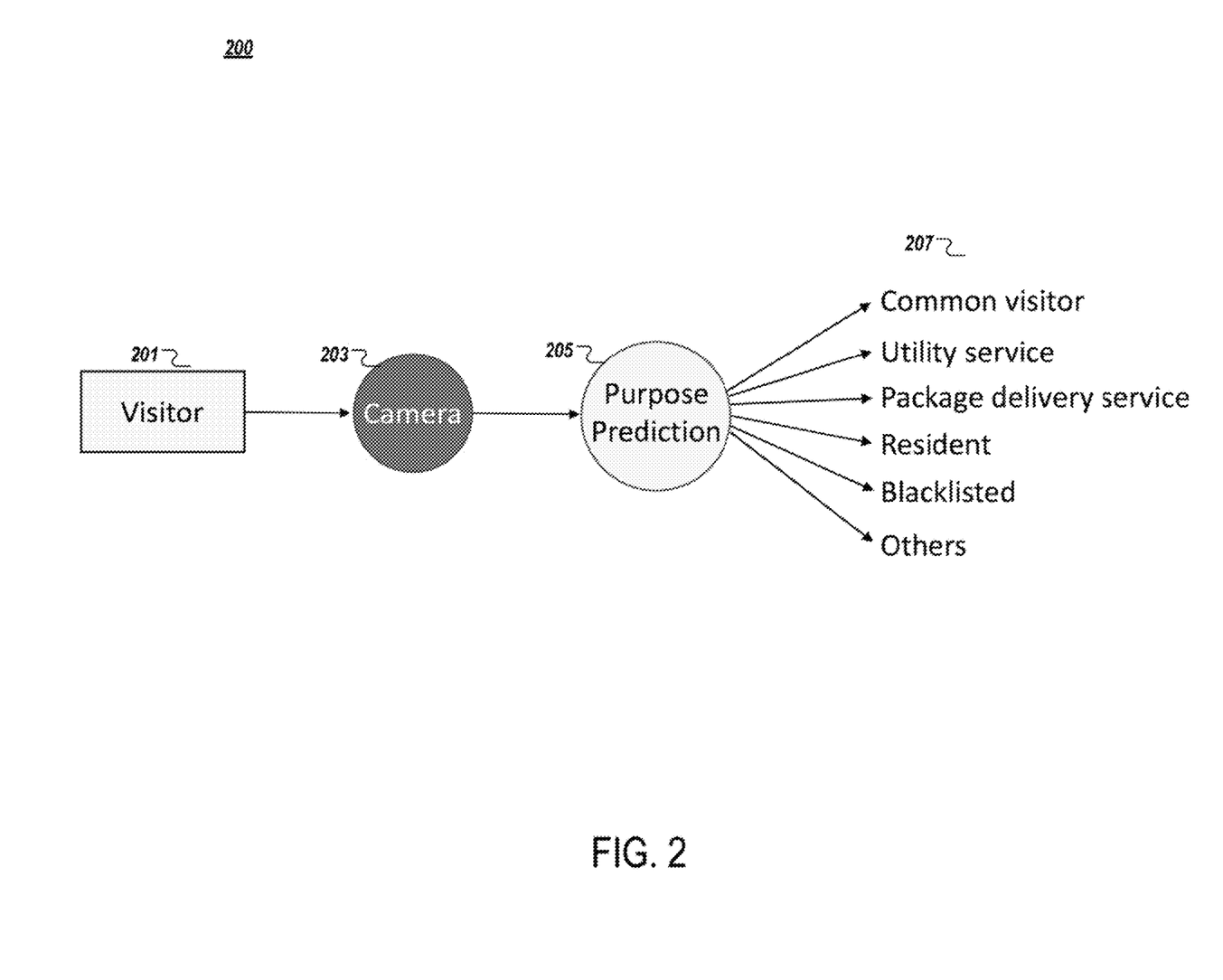
FIG. 2 is a functional block diagram of an example implementation associated with use of an audio stream in the quiet room to measure a noise level from the source room.

The purpose prediction module 107 classifies images of visitors into different groups. As shown in FIG. 2, the purpose prediction module 200 receives the visual information of a visitor 201 captured by a camera 203 as inputs. The classifier 205 of the purpose prediction module 205 classifies the visiting purpose into one of a plurality of categories 207. For example but not by way of limitation, the categories may include, but are not limited to, a common visitor, a utility service, a package delivery service, a resident, a blacklisted visitor, and others. Based on the categories 207, one or more actions are invoked.

Similar to the object detection module 105, the purpose prediction module 107 is a convolutional neural network (CNN) that will convert visitor images into feature vectors and categorize them with a classifier (e.g., softmax) in an end-to-end fashion. According to an example implementation, MobileNetV2 [7] may be used to predict visitor purpose, for example.

For authentication, the purpose prediction module 107 will convert the server image provided by service provider into a feature vector. Then, feature vectors of each visitor are compared based on distance to identify the server. The module may be trained with triplet loss to make sure images of the same server will have smallest feature distance.

The dialogue system 109 takes visitor speech as inputs, then processes the inputs into machine readable contents and extracts crucial information to determine corrective actions. The dialogue system 109 can be divided into two submodules based on different purpose: speech recognition and text summarization. The submodule for speech recognition translates audio signals into readable contents, which are further sent to summarization submodule to extract key information such as visitor's name and intentions, etc., and trigger corresponding reactions based on extracted information. Both submodules may be implemented using methods such as Attention+ConvNet for speech recognition and pretrained Bert for summarization.

Figure 3:
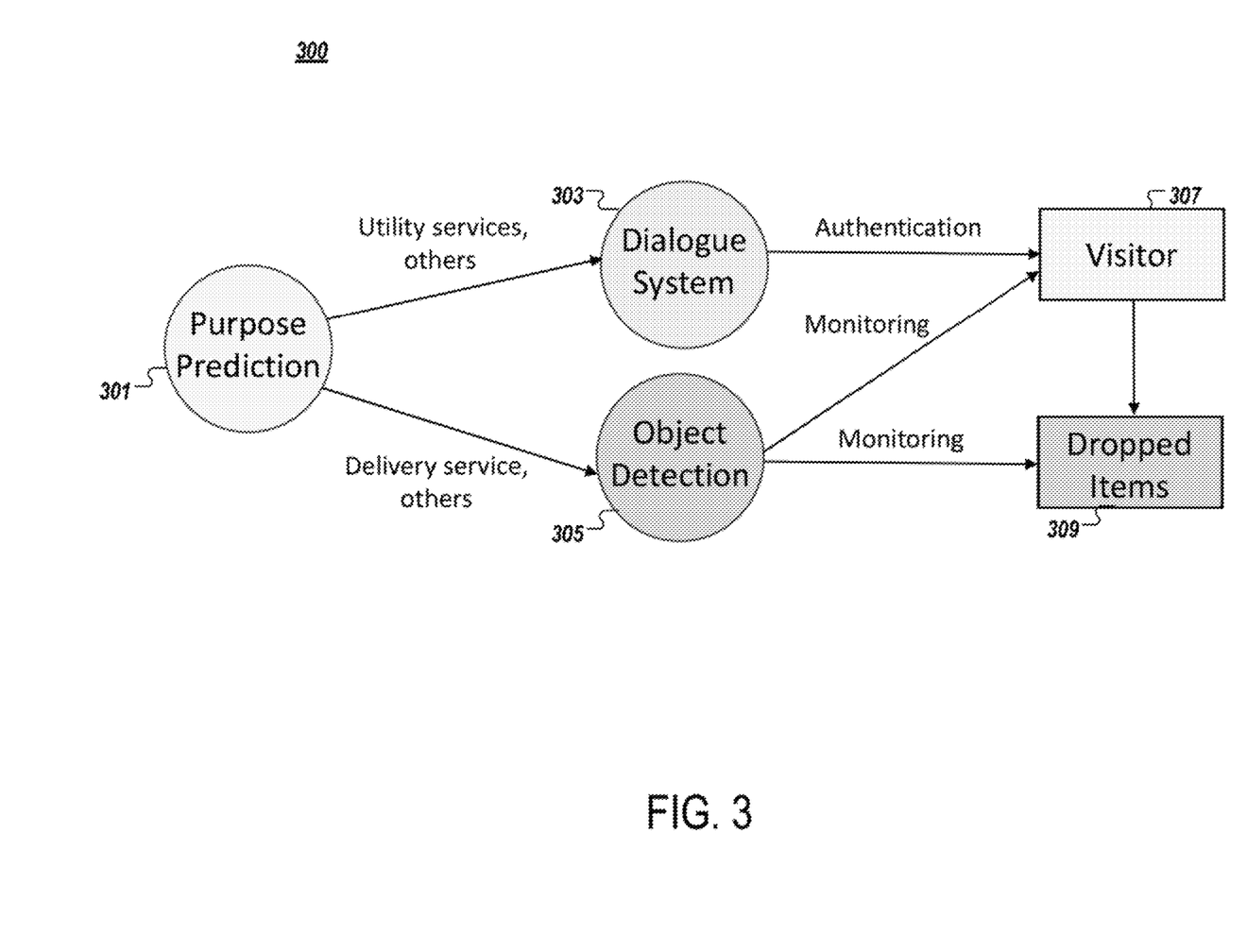
FIG. 3 is a workflow an example implementation.

FIG. 3 illustrates a process flow 300 according to an example implementation. More specifically, if the purpose prediction module 301 identifies a visitor 307 as a utility service person, the dialogue system 303 will be involved. More specifically, the visitor may provide speech as inputs, which are processed by the dialogue system 303, which in turn extracts information of the user and provides authentication. If the visitor 307 is classified as a package delivery person by the purpose prediction module 301, then the object detection module 305 is invoked. As explained above, monitoring of the package is performed to avoid theft or damage, as well as the drop items 309, if any. If the visitor 307 is classified as "others", then both the dialogue system 33 and the object system 305 are invoked, to track for suspicious behavior, and to provide the resident with an early-stage warning of the behavior of the visitor 307, if necessary. According to this process flow 300, it is not necessary for a resident to personally answer the door.

Figure 4:
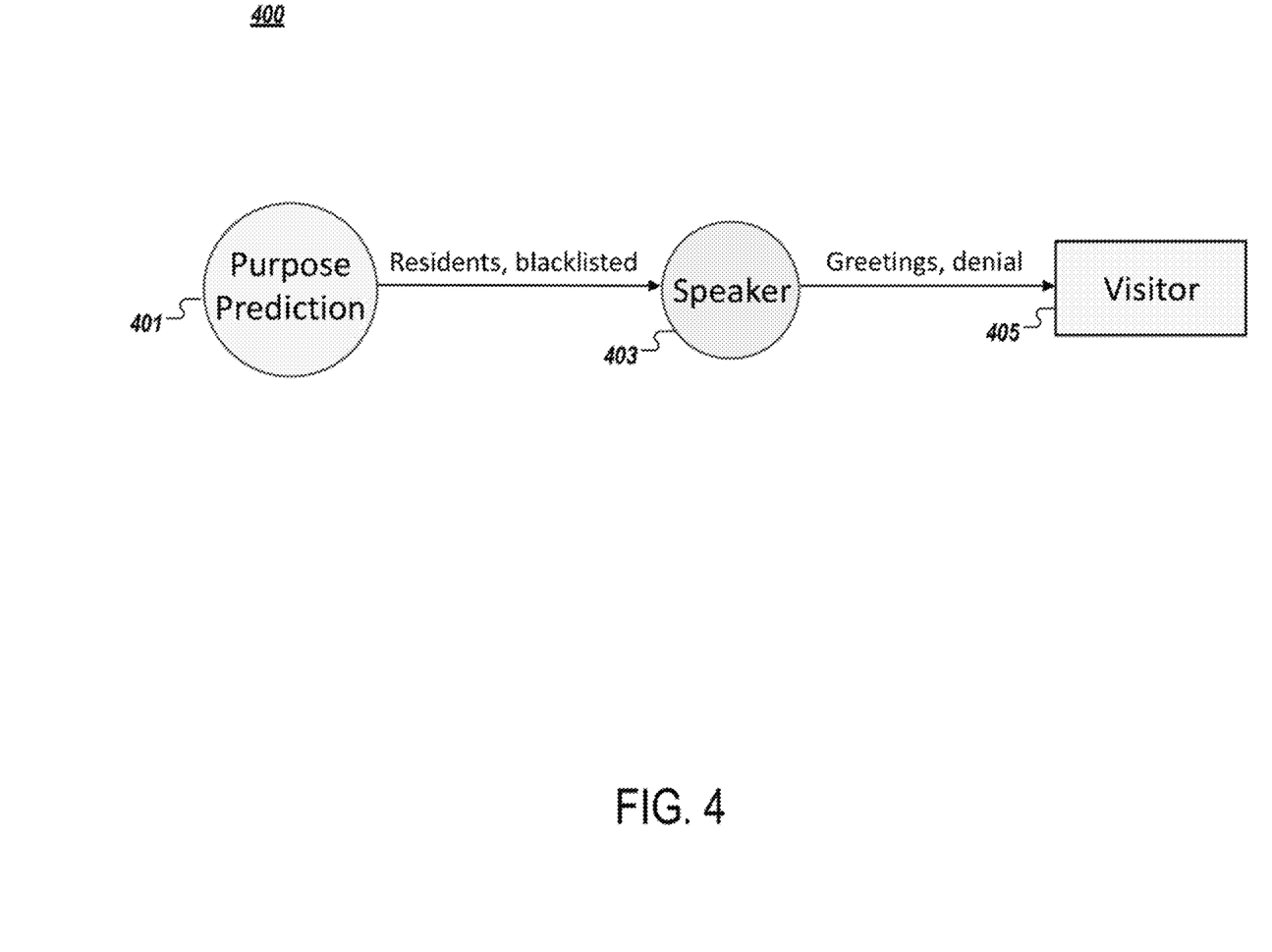
FIG. 4 is a workflow an example implementation.

FIG. 4 illustrates a process flow 400 according to an example implementation. More specifically, if the purpose prediction module 401 determines that the visitor 405 is identified as a resident, then the visitor 405 is provided with a greeting by an output device such as a speaker 403. Alternatively, if the visitor 405 is identified as being blacklisted by the purpose prediction module 401, the visitor 405 is provided with a notice of denial by an output device such as a speaker 403. In this circumstance as well, the resident need not personally answer the door.

Figure 5:
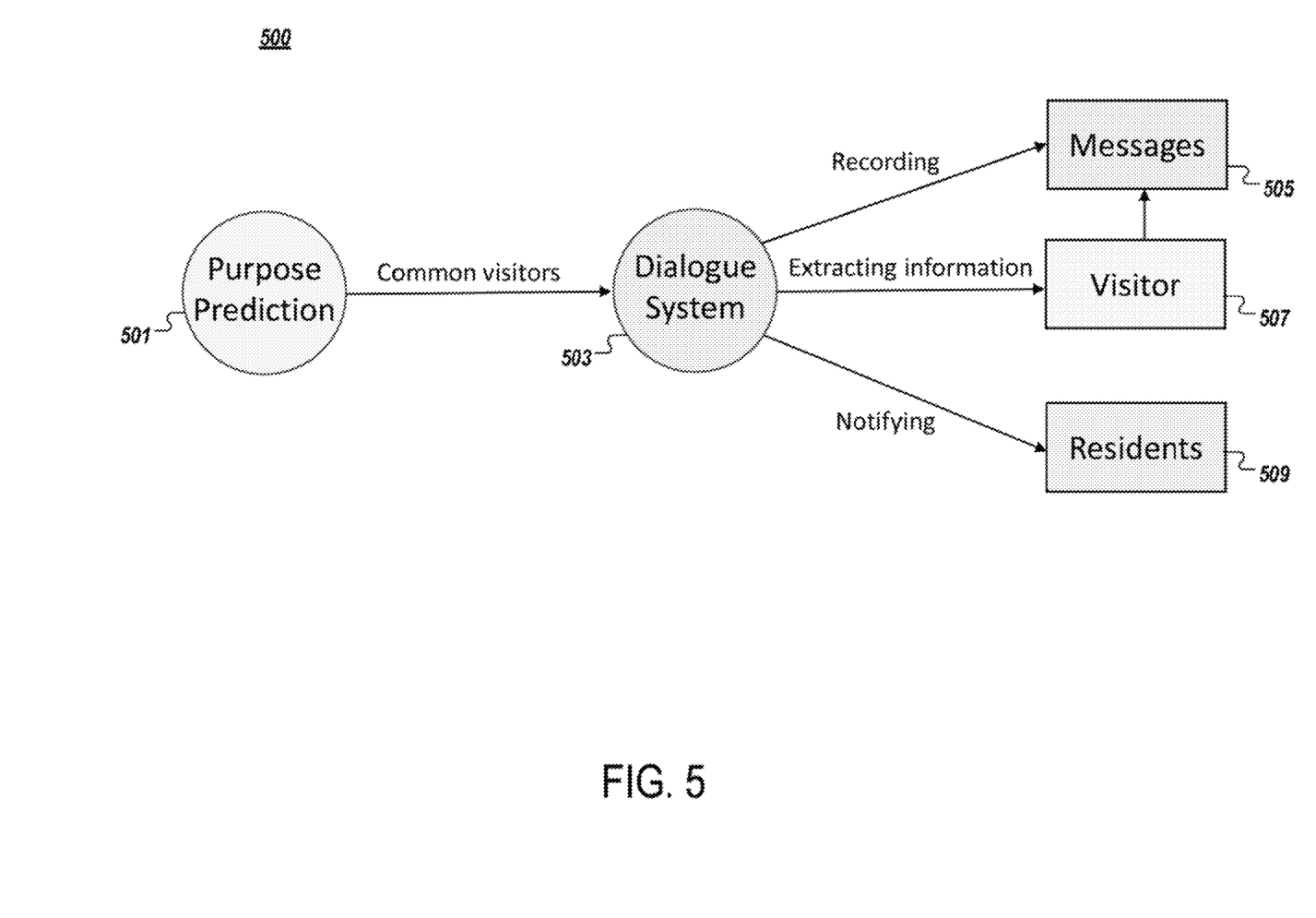
FIG. 5 is a workflow an example implementation.

FIG. 5 illustrates a process flow 500 according to an example implementation. More specifically, if a visitor 507 is identified by the purpose prediction module 501 as a common visitor, then the dialogue system 503 is in. More specifically, information is extracted from the visitor 507. Further, the dialogue system 503 provides the residents 509 with a notification of the visitor 507. The visitor 507 may communicate, by providing messages 505 with the dialogue system 503. Similarly, the residents 509, may communicate with the visitor 507 by providing a recording, via dialogue system 503, of messages 505.

Figure 6A:
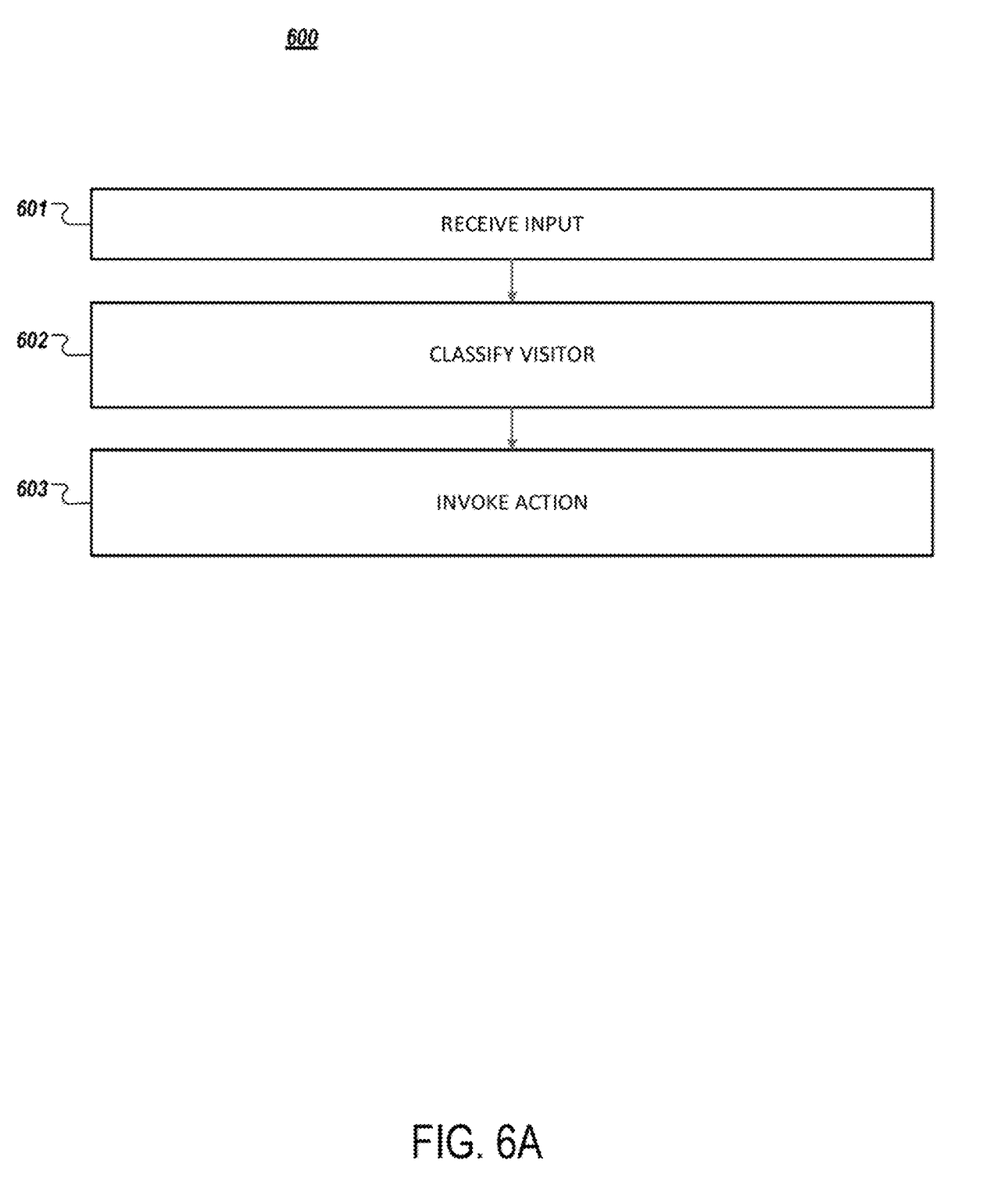
FIGS. 6A and 6B are flowcharts of an example implementation of a method according to the disclosure.
Figure 6B:
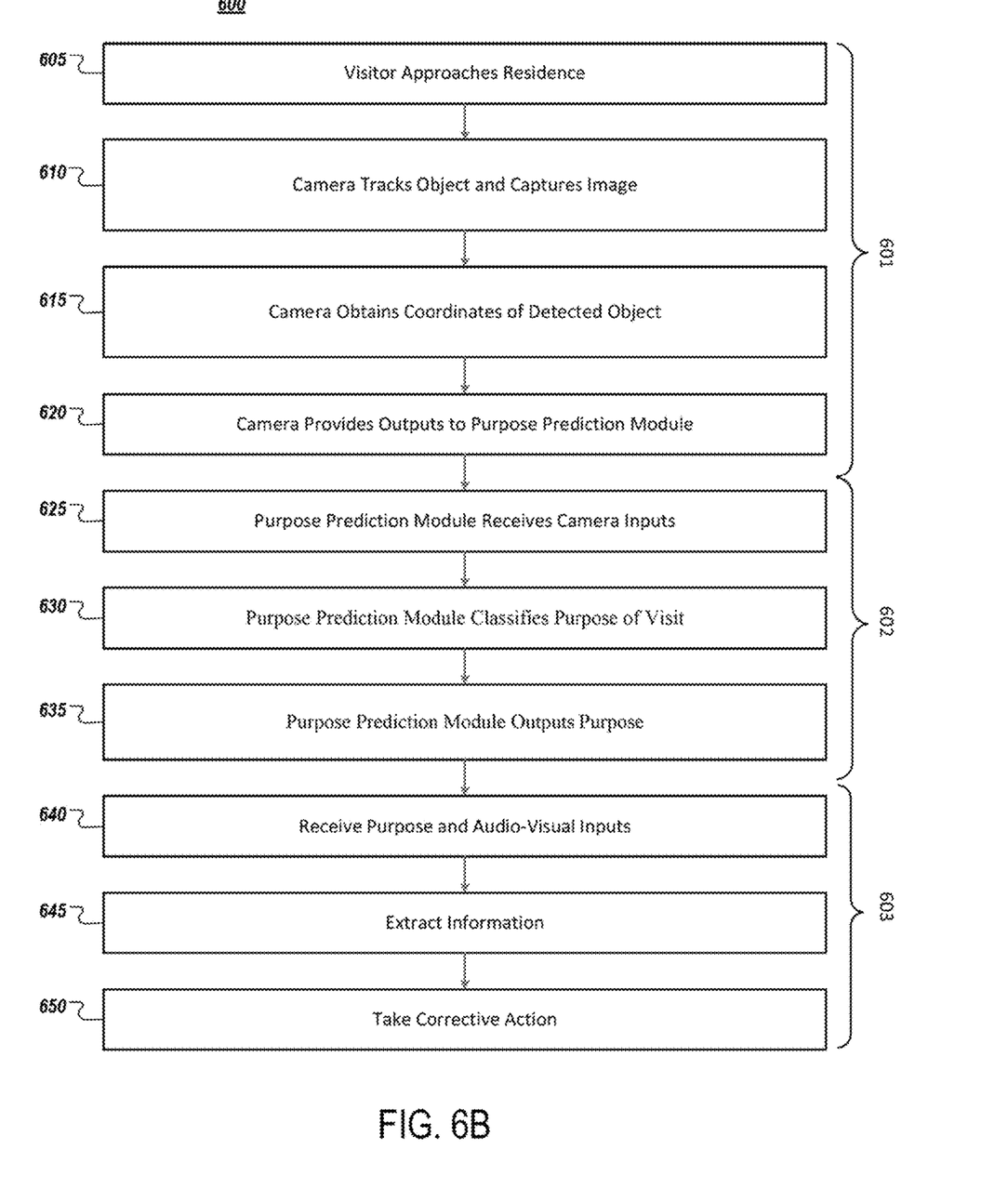

FIGS. 6A and 6B are a flowcharts of an embodiment of a method for according to the disclosure. A method 600 can be implemented by one or more processors in a computing environment (e.g., the computing environment described below). As shown in FIG. 6A, the method 600 can be a combination of multiple subprocesses, including receiving an input associated with the arrival of an entity, such as an object or an individual at 601, performing classification of the purpose of the arrival of the entity at 602, and based on the determined classification of the purpose of the arrival of the entity, invoking an action at 603. The specific inputs received, classes of classification, and actions are disclosed above with respect to the description of FIGS. 1-5.

In more detail, FIG. 6B illustrates an example process associated with the present example implementations. While the operations described herein are sequenced according to the drawings, the present plantations are not limited thereto. For example, the sequence of operations may be changed, and operations may be combined, separated or deleted, without departing from the inventive scope.

At 605, an entity may approach a building. For example but not by way of limitation, a visitor may approach a residence, an office building, or a retail location.

At 610, a sensor may sense the presence of the entity. More specifically, the sensor may determine that an entity has come with then a sensing range. Such a sensing range may be a parking lot, property line, perimeter, fence line or other distance based region from the sensor. Further, the sensor may be a camera, or a plurality of cameras communicatively coupled in coordination, to track the entity while the entity, and capture an image of the entity.

While the sensor is referred to herein as a camera, the present example implementation is not limited to a camera, or a visual image. Other sensors that capture identifying information associated with the entity may be substituted for use in combination with a camera. A heat sensor, infrared sensor, radar, audio-based sensor for other sensor may be substituted for the camera, without departing from the inventive scope.

At 615, the sensor obtains further locational information associated with the detected and tracked entity. For example, a camera may obtain coordinates associated with a detective visitor or object, in addition to the sensed image information.

In addition to the camera, other sensors may also be employed with the camera, to obtain additional information associated with the entity. For example, but not by way of limitation, a barcode reader or QR code scanner may be provided, such that external information on a delivered package may be sensed in a manner that permits identification of the contents of the package. Thus, if a delivered package has a sensitive aspect, such as medicine that needs to be properly stored, groceries that need to be chilled or frozen, valuable documents that need to be immediately secured, or the like, appropriate identification may be performed and action may be taken.

At 620, the information sensed by the one or more sensors, including but not limited to image information and coordinates, is provided to a purpose prediction module. Further details of the purpose prediction module are described above with respect to the example limitations.

Accordingly, the detection 601, may be performed as explained above operations 605-620. As explained below, the classification 602 may be performed.

At 625, the purpose prediction module receives one or more inputs from the sensors. For example and not by way of limitation, the received inputs may include information associated with images, location, barcode or QR code, temperature, or other sensed information that would provide identifying data for the purpose prediction module.

At 630, the purpose prediction module applies the received inputs to perform classification. Details of the classification operation are described above with respect to the example implementations. As a result, the purpose prediction module provides an output that includes a predicted purpose of the visit. Examples of the predicted purpose of the visit are also explained above.

At 635, the output of the purpose prediction module is generated, and provided to the dialogue system. As explained elsewhere in this disclosure, the dialogue system generates an action to be taken based on the classification.

At 640, the dialogue system, which may also be referred to as a dialogue management system, receives the classified purpose prediction, and apply the classified purpose prediction to the rules and settings associated with the resident. The dialogue system also may receive audio and visual input from the visitor, based on prompts provided to the visitor, or possibly based on visitor initiated input.

In addition to a microphone, the visitor may provide the information directly from his or her mobile device at a remote location from the entry of the building. Thus, the visitor may be able to maintain social distancing while communicating necessary information with the dialogue system. Similarly, an intercom system may be provided for the visitor to enter any necessary information directly. As explained in this disclosure, authentication may also be required, depending on the specific classification results of the purpose prediction module.

At 645, the dialogue system extracts necessary information. This information may come from a database or cloud service, and may include a rule base that provides the dialogue system with the necessary information on the type of action to be taken based on the classification. Further information may be extracted from the sensors, the purpose prediction module, or other information sources.

At 650, the dialogue system generates the necessary information to take corrective actions. The corrective actions to be taken are described above with respect to each of the example classifications invited.

These classifications are merely examples of classifications, and additional classifications may be provided or substituted for existing classifications without departing for the inventive scope. For example but not by way of limitation, while the classifications described herein may commonly refer to the situation of a building being a residence, other classifications may be employed situation a retail building, manufacturing facility, a transportation hub such as airport, port, train station or the like, and office building, or other buildings that may have different entities arriving for different purposes.

Further, it is also noted that while some example implementations may refer to the delivery of a product having a visitor to bring the product, the example implementations are not limited to such a mode of delivery. For example not by way of limitation, the delivery may be performed by a vehicle that is driverless or navigated in an automated manner, or that delivers package to its final location without a person. Such approaches may include robot, drone or other automated delivery technologies as would be understood to those skilled in the art.

Figure 7:
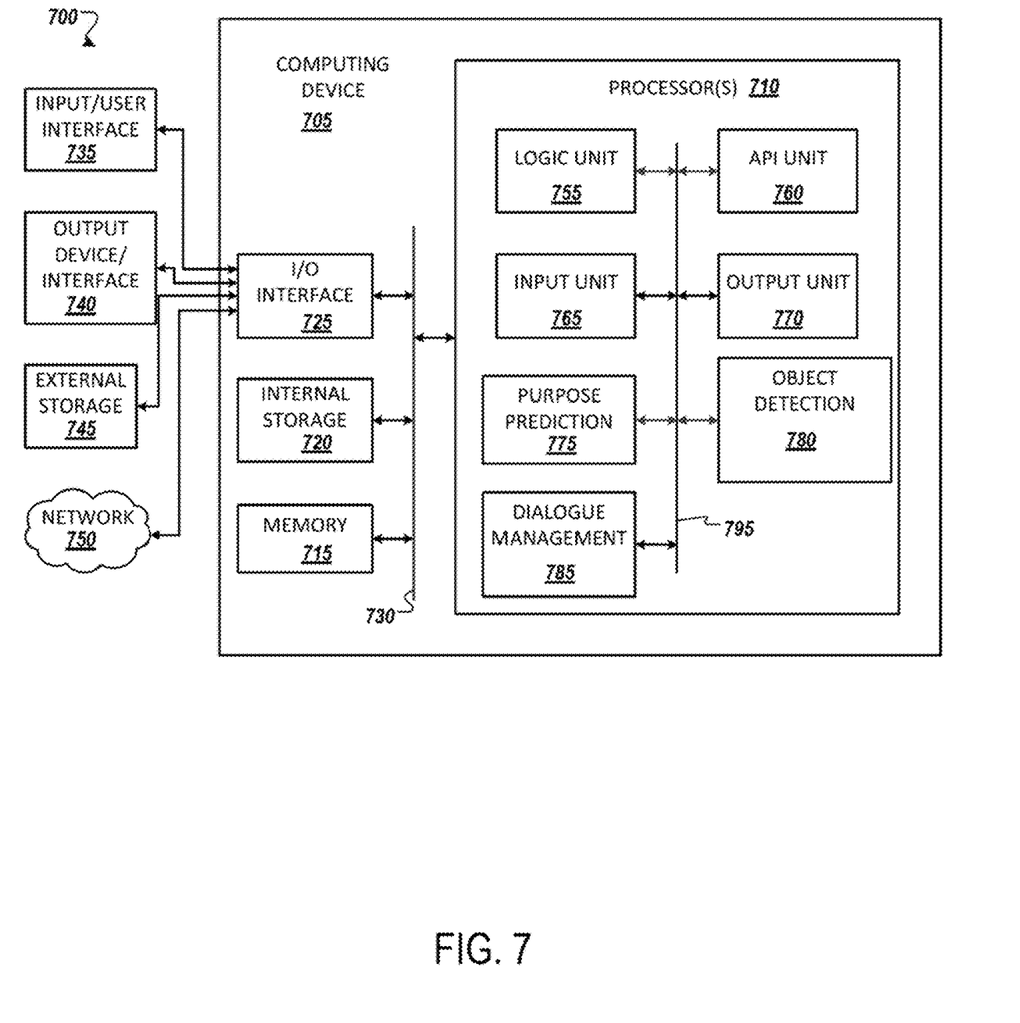
FIG. 7 is a functional block diagram of an example implementation of a computing environment according to the disclosure.

FIG. 7 is a functional block diagram of an embodiment of a computing environment according to the disclosure. A computing environment 700 with an example computer device 705 suitable for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705. The environment 700 can support operations associated with the system 100, for example.

According to the present example implementations, the processing associated with the neural activity may occur on a processor 710 that is the central processing unit (CPU). Alternatively, other processors may be substituted therefor without departing from the inventive concept. For example, but not by way of limitation, a graphics processing unit (GPU), and/or a neural processing unit (NPU) may be substituted for or used in combination with the CPU to perform the processing for the foregoing example implementations.

Computing device 705 can be communicatively coupled to input/interface 735 and output device/interface 740. Either one or both of input/interface 735 and output device/interface 740 can be a wired or wireless interface and can be detachable. Input/interface 735 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 740 may include a display, television, monitor, printer, speaker, braille, or the like. In some example implementations, input/interface 735 (e.g., user interface) and output device/interface 740 can be embedded with, or physically coupled to, the computing device 705. In other example implementations, other computing devices may function as, or provide the functions of, an input/interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as, a server, client, thin server, general machine, special-purpose machine, or another label. For example but not by way of limitation, network 750 may include the blockchain network, and/or the cloud.

I/O interface 725 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 710 can execute under any operating system (OS) (not shown), in a native or virtual environment. One or more applications can be deployed that include logic unit 755, application programming interface (API) unit 760, input unit 765, output unit 770, purpose prediction unit 775, object detection unit 780, prediction unit 785, and inter-unit communication mechanism 795 for the different units (e.g., the encode 110 and the decoder 120) to communicate with each other, with the OS, and with other applications (not shown).

The purpose prediction unit 775 can perform functions associated with receiving inputs, processing inputs, and determining a classification of the visitor. The object detection unit 780 can perform functions associated with the detection of the object being delivered. The dialogue management unit 785 can perform functions associated with the receiving input such as speech from the visitor, and providing the resident with an opportunity to provide an output to the visitor.

For example, the purpose prediction unit 775, the object detection unit 780, and the dialogue management unit 785 may implement one or more processes shown above with respect to the structures described above in addition to the method 300 and the method 400. The described units and elements can be varied in design, function, configuration, or implementation and are not limited to the descriptions provided.

In some example implementations, when information or an execution instruction is received by API unit 760, it may be communicated to one or more other units (e.g., logic unit 755, input unit 765, purpose prediction unit 775, object detection unit 780, and prediction unit 785).

In some instances, the logic unit 755 may be configured to control the information flow among the units and direct the services provided by API unit 760, input unit 765, purpose prediction unit 775, object detection unit 780, and dialogue management unit 785 in some example implementations described above. For example, the flow of one or more processes or implementations may be controlled by logic unit 755 alone or in conjunction with API unit 760.

Figure 8:
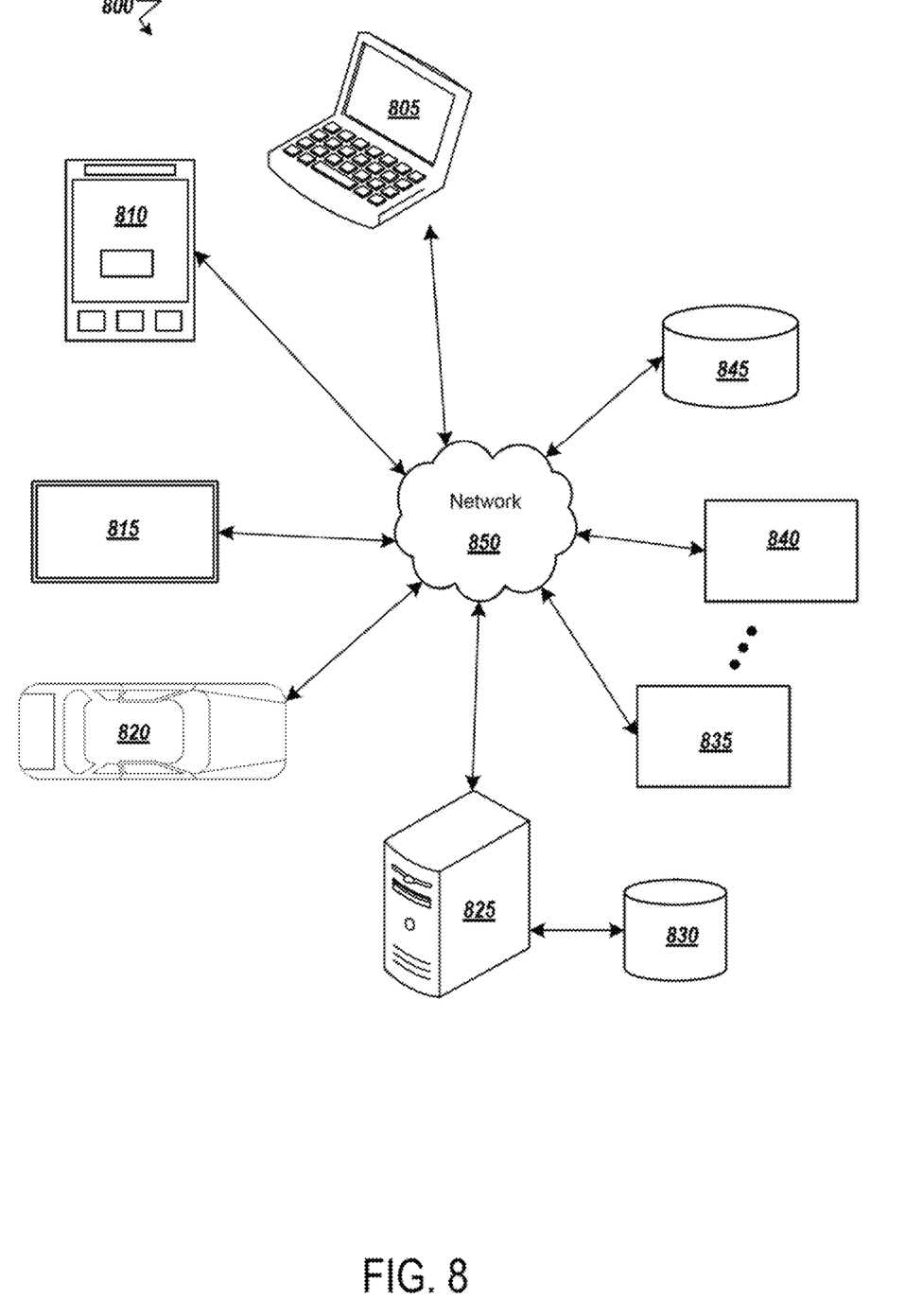
FIG. 8 is a functional block diagram of an exemplary operating environment according to the disclosure.

FIG. 8 is a functional block diagram of an exemplary operating environment according to the disclosure. An environment 800 can be suitable for some example implementations disclosed herein. Environment 800 includes devices 805-845, and each is communicatively connected to at least one other device via, for example, network 860 (e.g., by wired and/or wireless connections). Some devices may be communicatively connected to one or more storage devices 830 and 845.

An example of one or more devices 805-845 may be computing devices 705 described in FIG. 7, respectively. Devices 805-845 may include, but are not limited to, a computer 805 (e.g., a laptop computing device) having a monitor and an associated webcam as explained above, a mobile device 810 (e.g., smartphone or tablet), a television 815, a device associated with a vehicle 820, a server computer 825, computing devices 835-840, storage devices 830 and 845.

In some implementations, devices 805-820 may be considered user devices associated with the users, who may be remotely obtaining a sensed audio input used as inputs for the foregoing example implementations. In the present example implementations, one or more of these user devices 805-820 may be associated with one or more sensors such as microphones in a phone of a user, that can sense information as needed for the present example implementations, as explained above.

While the foregoing example implementations include examples of a building being residential, the present inventive scope is not limited thereto. For example but not by way of limitation, the building may be a building for retail, manufacturer, office, transportation, or other function. Further, for each of the different functions of building, the types of classifications may be customized to match the function of the building.

For example not by way of limitation, in the context of a retail building, classifications of visitor purposes may include shopping to purchase new goods, return previously purchased products, maintenance or service on existing products, employees coming to work, delivery of stock to be sold, cleaning and sanitation, law-enforcement and security, fire or others. The classification system of the purpose prediction module according to the example implementations is provided with necessary class information to perform appropriate purpose predictions for the retail environment of the building.

Similarly, in the context of an office, the present example implementations may serve provide support for a reception function. In many office environments, such as a medical office, law or accounting office, engineering office, etc. there may be a small number of receptionists having a large number of functional requirements. For example, a receptionist may be responsible for maintenance of the lobby condition, greeting visitors, taking visitors to meeting rooms or examination rooms, performing initial surveys or assessments of patients, receiving deliveries mail, handling insurance and financial transactions, maintaining security, interfacing with information technology personnel, maintain a kitchen environment, etc. the present example implementations provide a classification for each of the visitors.

Thus, because it is not necessary for the resident to answer or directly interact in every situation, the receptionist may be able to more easily perform his or her functions, without having to constantly shift his or her attention or physical location, every time object or visitor arrives at the office. According to the example stations, a receptionist may be able to more efficiently perform the functions without distraction, and focus on interaction with visitors having the purpose requiring such interaction.

Further, while the foregoing example implementations refer to the implementation of various sensors, it is noted that the present example implementations may be integrated with existing sensor technology at the building. For example not by way of limitation, a building at an intercom system with video and audio inputs may be integrated with the purpose prediction module, dialogue system, etc., without requiring the purchase of new sensors or related hardware.

While the foregoing example implementations refer to visitors or objects, each of which may have a single purpose, the present example implementations are not limited thereto. For example but not by way of limitation, a visitor may be arriving to perform a service, but may also be a friend or colleague. Similarly, a visitor delivering a product may also be blacklisted. Thus, the present example implementations envision a rule-based with a conflict resolution mechanism and a hierarchical approach that permits user customization as well as standardized rules to handle such situations.

With respect to the customization, the present example implementation permits a residence, who may be the owner of the account associated with the system, to create a list of visitors that the resident has screened as being appropriate to meet, or has blocked as being inappropriate to meet. Such lists may be maintained on an individualized basis, or may be shared across multiple facilities. According to one such approach, a user may wish to have his or her lists included not only in his or her residence, but also his or her office, such that if a person on one of the lists attempts to visit at the office instead of home, that person is appropriately provided with access, or denied access.

Further, the customization may also be directed to object delivery such as packages. According to one example implementation, specialized rules may be provided particular packages. Additionally, customized messages may be provided to a delivery person in the delivery person must personally deliver the package all the way to the entrance of the building. For example but not by way of limitation, delivery person may be requested to wear appropriate protective personal equipment, such as a facemask, face shield, gloves or the like, when approaching an entry to a building.

The customization may also be included as a rule, such that when a package is delivered by a particular organization, or burying a specific identification information, the same messages always provided to that the person. The message may also indicate any special rules for the placement or handling of the package during the delivery process.

According to the present example implementations, authentication may be provided for service, products and visitors. For example but not by way of limitation, if it is determined that the purpose of a visitor is to perform service, such as maintenance or repair within the building, the visitor may be provided with a code in advance, such that when the visitor arrives, he or she may simply enter the code, have the entrance automatically unlocked, and enter the building to perform the necessary service, without requiring the resident to answer the door or interact with the repairperson.

The authentication according to the present example implementations may permit the resident to receive services and maintenance within the building, such as a home, without having to physically interact with the person doing the repairs. Accordingly, the resident may be able to maintain social distancing while allowing the visitor to perform necessary in-building services. As a result, a risk of transmission of contagious disease or virus is reduced, while the resident can enjoy the repair service, and the repairperson can continue to perform his or her business.

Aspects of the example implementations may have various advantages and benefits with respect to the related art. For example but not by way of limitation, the example implementations provide a combination of object detection and video recording, as well as purpose prediction and dialogue system, to permit a president to remotely interact with an entry to the building. Where the visitor is classified as suspicious, residents may be provided with a warning. When the visitor provides a package, the package may be tracked.

According to some example implementations, the workflow may be customized, and visitors may be authenticated. Further, some visitors may be on a blacklist as explained above. As a result, instead of notifying a resident each and every time a visitor enters the supervised area, the resident is only worn when the classification system determines that there is a danger, due to the visitor bad intentions. Thus, unnecessary false alarms are reduced. Further, when visitors and deliver items that, by using the purpose prediction dialogue system, certain classes of visitors and deliver items to be handled automatically, without requiring the resident to answer the visitor.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

What is claimed is:

1. A computer-implemented method, comprising:
providing an access code to an entity in advance;
receiving an input associated with an arrival of the entity;
performing a classification on the input to determine a purpose of the arrival of the entity, wherein a prediction is performed based on visual information of the entity to classify a predicted purpose by use of a convolutional neural network (CNN) that converts the visual information into feature vectors, wherein the feature vectors are categorized and referenced to predict the purpose of the arrival of the entity;
based on a determined classification of the purpose of the arrival of the entity, invoking an action without interaction with the entity, wherein the action comprises at least an authentication comprising converting a server image provided by a service provider into a feature vector, and comparing a feature vector of the entity based on distance to identify a server, wherein training is performed with a triplet loss such that images of a common server will have a smallest feature distance; and
when no entity has arrived, monitoring contextual environment and predicting temperature and weather to recommend a delivery location.

2. The computer-implemented method of claim 1, wherein, the entity comprises at least one of an object and a visitor, and the arrival comprises the at least one of the object and the visitor arriving in a vicinity of a building.

3. The computer-implemented method of claim 2, wherein the building comprises one or more of a residence, an office building, a retail location, a manufacturing facility or a transportation hub.

4. The computer-implemented method of claim 1, wherein the receiving comprises a sensor sensing a presence of the entity with a sensing range to obtain locational information associated with the entity and sensed image information, and a code reader that senses information associated with a code on an object.

5. The computer-implemented method of claim 1, wherein the performing the prediction comprising receiving as the input visual information of the entity captured by a sensor, wherein the feature vectors are categorized with a classifier in an end-to-end fashion, to generate an output including the predicted purpose of the arrival of the entity.

6. The computer-implemented method of claim 5, wherein the predicted purpose comprises one or more of a common visit, a utility service, a package delivery service, a resident of a location of the arrival, and a blacklisted entity.

7. The computer-implemented method of claim 1, wherein the invoking the action comprises generating the action based on the prediction by application of rules and settings associated with one or more customized preferences of a resident at a location of the arrival.

8. The computer-implemented method of claim 1, wherein the action comprises one or more of authentication, monitoring, granting access, denying access, extracting information from the entity, notifying a resident of a location of the arrival, and receiving and/or transmitting information with the entity.

9. A non-transitory computer readable medium including instructions executable on a processor, the instructions comprising:
providing an access code to an entity in advance;
receiving an input associated with an arrival of the entity;
performing a classification on the input to determine a purpose of the arrival of the entity, wherein a prediction is performed based on visual information of the entity to classify a predicted purpose by use of a convolutional neural network (CNN) that converts the visual information into feature vectors, wherein the feature vectors are categorized and referenced to predict the purpose of the arrival of the entity;
based on a determined classification of the purpose of the arrival of the entity, invoking an action without interaction with the entity, wherein the action comprises at least an authentication comprising converting a server image provided by a service provider into a feature vector, and comparing a feature vector of the entity based on distance to identify a server, wherein training is performed with a triplet loss such that images of a common server will have a smallest feature distance; and
when no entity has arrived, monitoring contextual environment and predicting temperature and weather to recommend a delivery location.

10. The non-transitory computer readable medium of claim 9, wherein, the entity comprises at least one of an object and a visitor, and the arrival comprises the at least one of the object and the visitor arriving in a vicinity of a building that comprises one or more of a residence, an office building, a retail location, a manufacturing facility or a transportation hub.

11. The non-transitory computer readable medium of claim 9, wherein the receiving comprises a sensor sensing a presence of the entity with a sensing range to obtain locational information associated with the entity and sensed image information, and a code reader that senses information associated with a code on an object.

12. The non-transitory computer readable medium of claim 9, wherein the performing the prediction comprising receiving as the input visual information of the entity captured by a sensor, wherein the feature vectors are categorized with a classifier in an end-to-end fashion, to generate an output including the predicted purpose of the arrival of the entity.

13. The non-transitory computer readable medium of claim 12, wherein the predicted purpose comprises one or more of a common visit, a utility service, a package delivery service, a resident of a location of the arrival, and a blacklisted entity.

14. The non-transitory computer readable medium of claim 9, wherein the invoking the action comprises generating the action based on the prediction by application of rules and settings associated with one or more customized preferences of a resident at a location of the arrival.

15. The non-transitory computer readable medium of claim 9, wherein the action comprises one or more of authentication, monitoring, granting access, denying access, extracting information from the entity, notifying a resident of a location of the arrival, and receiving and/or transmitting information with the entity.

16. A system, comprising:
a processor that provides an access code to an entity in advance;
a sensor that receives an input associated with an arrival of the entity;
the processor that performs a classification on the input to determine a purpose of the arrival of the entity, wherein a prediction is performed based on visual information of the entity to classify a predicted purpose by use of a convolutional neural network (CNN) that converts the visual information into feature vectors, wherein the feature vectors are categorized and referenced to predict the purpose of the arrival of the entity;
based on a determined classification of the purpose of the arrival of the entity, the processor invoking an action without interaction with the entity executed by a device, wherein the action comprises at least an authentication comprising converting a server image provided by a service provider into a feature vector, and comparing a feature vector of the entity based on distance to identify a server, wherein training is performed with a triplet loss such that images of a common server will have a smallest feature distance; and
when no entity has arrived, the processor monitoring contextual environment and predicting temperature and weather to recommend a delivery location.

17. The system of claim 16, wherein the sensor a presence of the entity with a sensing range to obtain locational information associated with the entity and sensed image information, and further senses information associated with a code on an object.

18. The system of claim 16, wherein the performing the prediction comprising receiving as the input visual information of the entity captured by a sensor, wherein the feature vectors are categorized with a classifier in an end-to-end fashion, to generate an output including the predicted purpose of the arrival of the entity.

19. The system of claim 16, wherein the invoking the action comprises generating the action based on the prediction by application of rules and settings associated with one or more customized preferences of a resident at a location of the arrival, wherein the action comprises one or more of authentication, monitoring, granting access, denying access, extracting information from the entity, notifying a resident of a location of the arrival, and receiving and/or transmitting information with the entity.

* * * * *